(12) United States Patent
Lampe et al.

(10) Patent No.: US 8,550,433 B2
(45) Date of Patent: Oct. 8, 2013

(54) ADJUSTABLE COLUMN SYSTEM AND METHOD

(75) Inventors: John Lampe, Hamilton, OH (US); Dominic DiPilla, Cincinnati, OH (US)

(73) Assignee: JWF Technologies, LLC, Fairfield, OH (US)

( * ) Notice: Subject to any disclaimer, the term of this patent is extended or adjusted under 35 U.S.C. 154(b) by 259 days.

(21) Appl. No.: 13/079,985

(22) Filed: Apr. 5, 2011

(65) Prior Publication Data

US 2011/0240938 A1    Oct. 6, 2011

Related U.S. Application Data

(60) Provisional application No. 61/320,933, filed on Apr. 5, 2010.

(51) Int. Cl.
*E21D 15/44*    (2006.01)
(52) U.S. Cl.
USPC ........................................................ 254/93 R

(58) Field of Classification Search
USPC .............................. 254/93 R, 93 L; 267/134
See application file for complete search history.

(56) References Cited

U.S. PATENT DOCUMENTS 4,133,411 A * 1/1979 Curb ........................... 182/2.11
6,386,528 B1 * 5/2002 Thorn et al. .................. 267/201

* cited by examiner

*Primary Examiner* — Lee D Wilson
*Assistant Examiner* — Jamal Daniel
(74) *Attorney, Agent, or Firm* — Frost Brown Todd LLC (57) ABSTRACT

An apparatus includes an outer rectangular tube and an inner rectangular tube. The inner rectangular tube and the outer rectangular tube are movable in relation to each other. In some versions a gas spring is positioned within the outer rectangular tube and the inner rectangular tube. In some versions, the apparatus further comprises a pair of inner bearing blocks operable to change the coefficient of friction between the inner rectangular tube and the outer rectangular tube. In some versions, the apparatus further comprises an outer bearing block assembly operable to change the coefficient of friction between the outer bearing block assembly and the inner rectangular tube.

19 Claims, 14 Drawing Sheets

ADJUSTABLE COLUMN SYSTEM AND METHOD

PRIORITY

This applications claims priority of U.S. Provisional Patent Application titled "Adjustable Column System and Method," Ser. No. 61/320,933, filed on Apr. 5, 2010, the disclosure of which is incorporated by reference in its entirety.

FIELD

Embodiments of the present invention relate, in general, to lift columns, and, in particular, to adjustable lift columns having adjustable bearings.

BACKGROUND

A gas spring is a type of spring that, unlike a typical metal spring, uses a compressed gas, contained in a cylinder and variably compressed by a piston, to exert a force. Gas springs are used frequently in automobile construction, where they are commonly used to support the weight of vehicle doors while they are open. They are also used in furniture, medical, and aerospace applications. In particular, gas springs have been adapted for use in adjustable lift columns for furniture and medical applications.

BRIEF DESCRIPTION OF THE DRAWINGS

The accompanying drawings incorporated in and forming a part of the specification illustrate several aspects of the present disclosure, and together with the description serve to explain the principles of the invention; it being understood, however, that the described embodiments are not limited to the precise arrangements shown. In the drawings, like reference numerals refer to like elements in the several views. In the drawings.

DETAILED DESCRIPTION

Embodiments described in this disclosure comprise a column assembly for raising and lowering various articles such as medical equipment, medical carts computer carts, furniture, tables, workstations, TV/monitors, monitor arms and medical equipment. In one embodiment the column assembly is not rotational and is configured to provide support for variable side loads.

Figure 1:
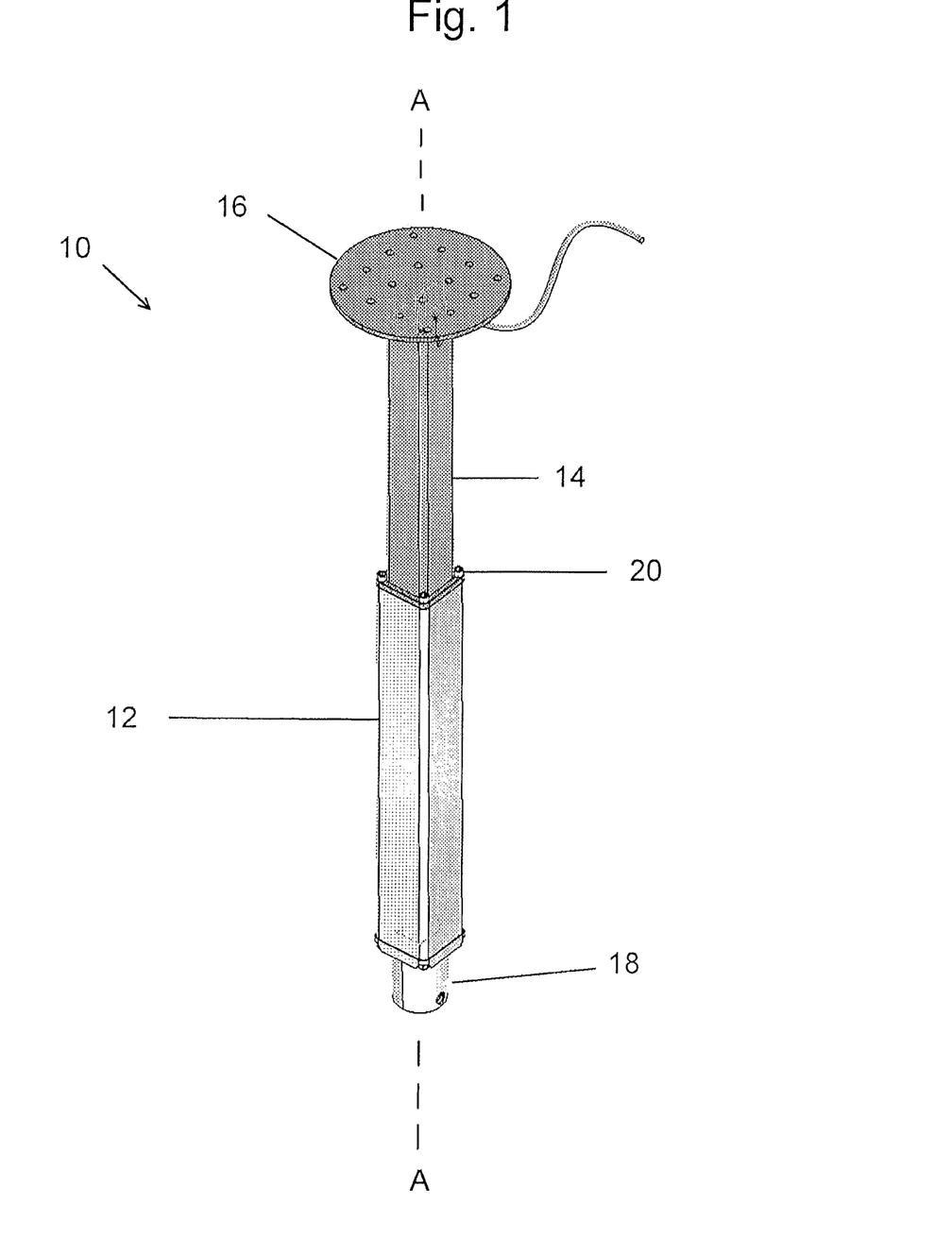
FIG. 1 is a plan view of one version of a lift column having an outer support tube, an inner tube, a top mounting flange, a lower mounting attachment, and an outer bearing block assembly.

Referring to FIG. 1, one version of a lift column 10 is shown having an outer support member 12, an inner tube 14, a top mounting flange 16, a lower mounting attachment 18, and an outer bearing block assembly 20. The inner tube 14 in configured to translate relative to the outer support member 12 along a central axis A-A. Translation of the inner tube 14 relative to the outer support member 12 increases or decreases the height of the lift column 10 depending on the direction of translation along axis A-A. Thus, the lift column 10 may be used in any suitable application, such as medical applications, to raise a lower devices mounted on the lift column 10. The inner tube 14 and outer support member 12 have substantially square-shaped cross-sections configured to resist rotational movement between the two components. Thus, the inner tube 14 has unidirectional movement along axis A-A as it translates within the outer support member 12. Support flanges may be attached or integral with the top and/or bottom portions of the column assembly to support equipment, a moveable base, or any other column feature.

The top mounting flange 16 is configured for attachment to any suitable component such as, for example, a medical device for which height adjustment is desirable. The lower mounting attachment 18 is configured to mate with any suitable base that serves to support the lift column. The base (not shown) may be wheeled, incorporate a swivel, be fixed to a structure, or have any other suitable configuration. It will be appreciated that the configuration of the column assembly can be inverted such that the outer support column has a top mounting flange and the inner tube is attached or integral with a base.

Figure 2:
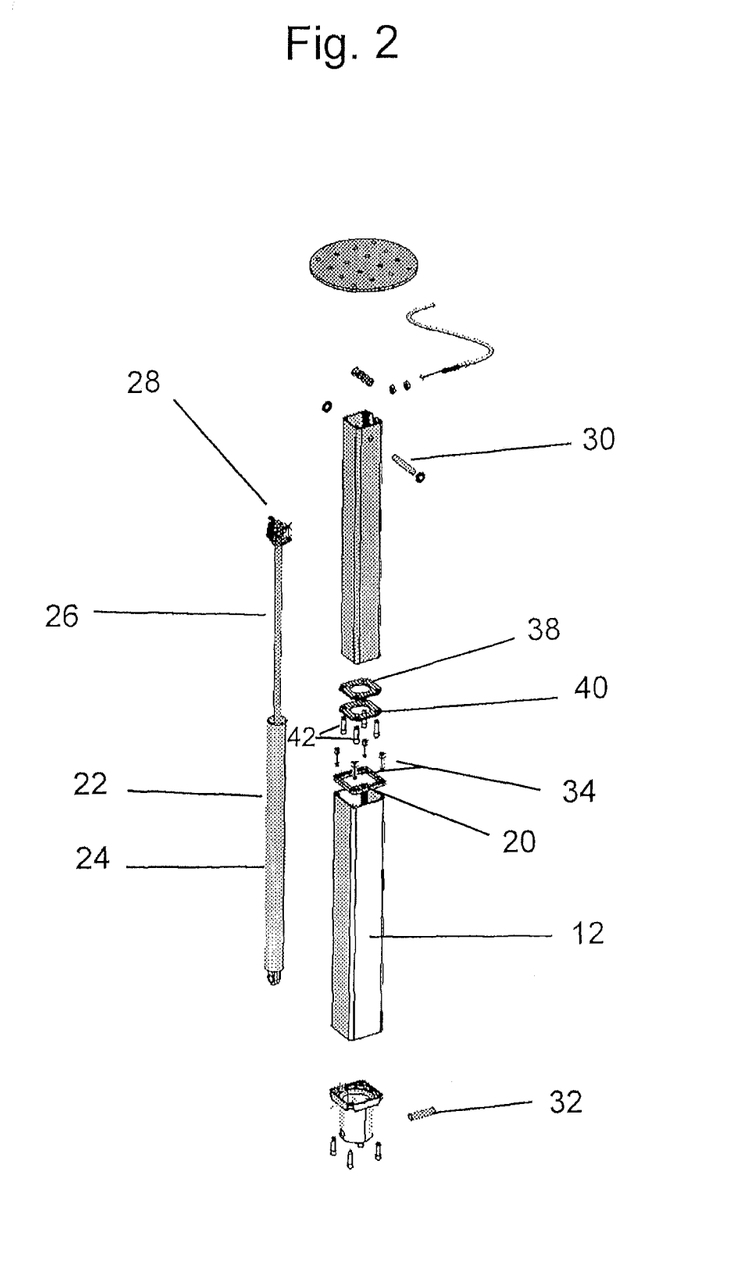
FIG. 2 is an exploded view of the lift column of FIG. 1 showing a gas spring retained within the inner tube and adjustable inner bear blocks configured to retain the gas spring and to translate within the outer support tube.

FIG. 2 illustrates an exploded view of the lift column 10 having a gas spring 22 configured to adjust the height of the lift column 10 by translating the inner tube 14 relative to the outer support member 12. The gas spring 22 includes a jacket tube 24 that is coupled to the lift column 10 at the base plate 18 and a piston rod 26 that is coupled to the inner tube 14 via a mounting member 28. As illustrated in FIG. 2, the mounting member 28 of the piston rod 26 is coupled to the upper portion of the inner tube 14 such that translation of the piston rod 26 relative to the jacket tube 24 translates the inner tube relative to the outer support member 12. As illustrated, the mounting member 28 and the jacket tube 24 are coupled to the inner tube 14 and base member 18, respectively, with a pin 30, 32.

Figure 5:
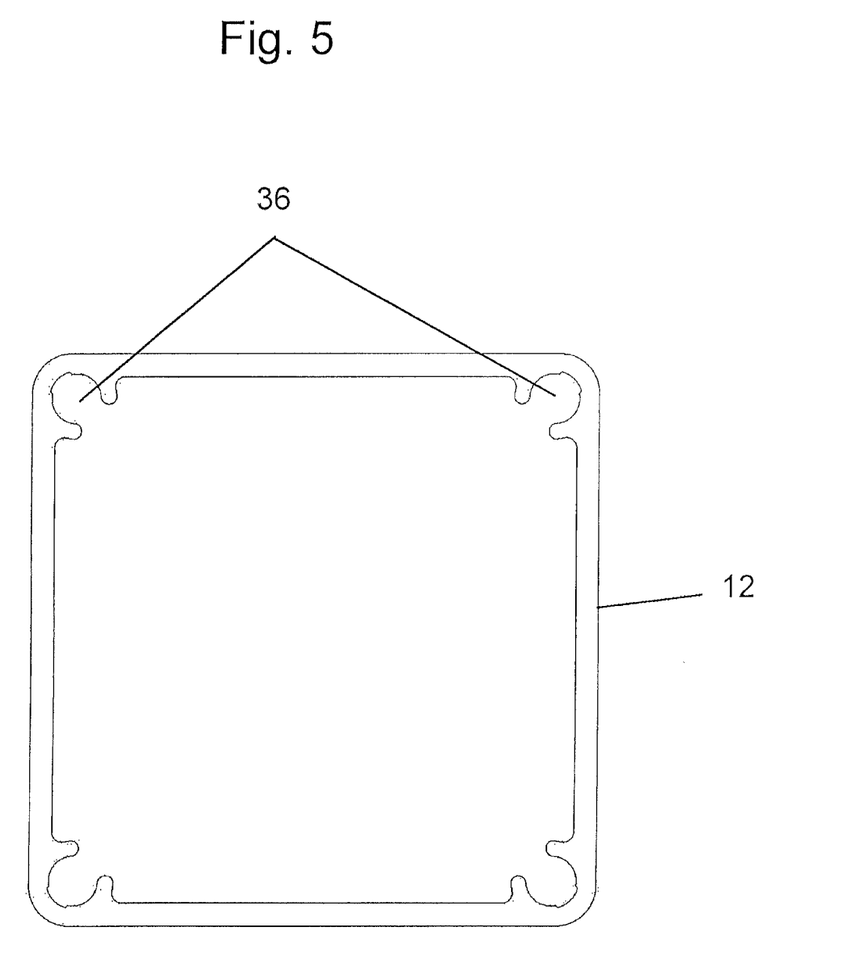
FIG. 5 is a top view of the outer support tube of the lift column of FIG. 1.
Figure 6:
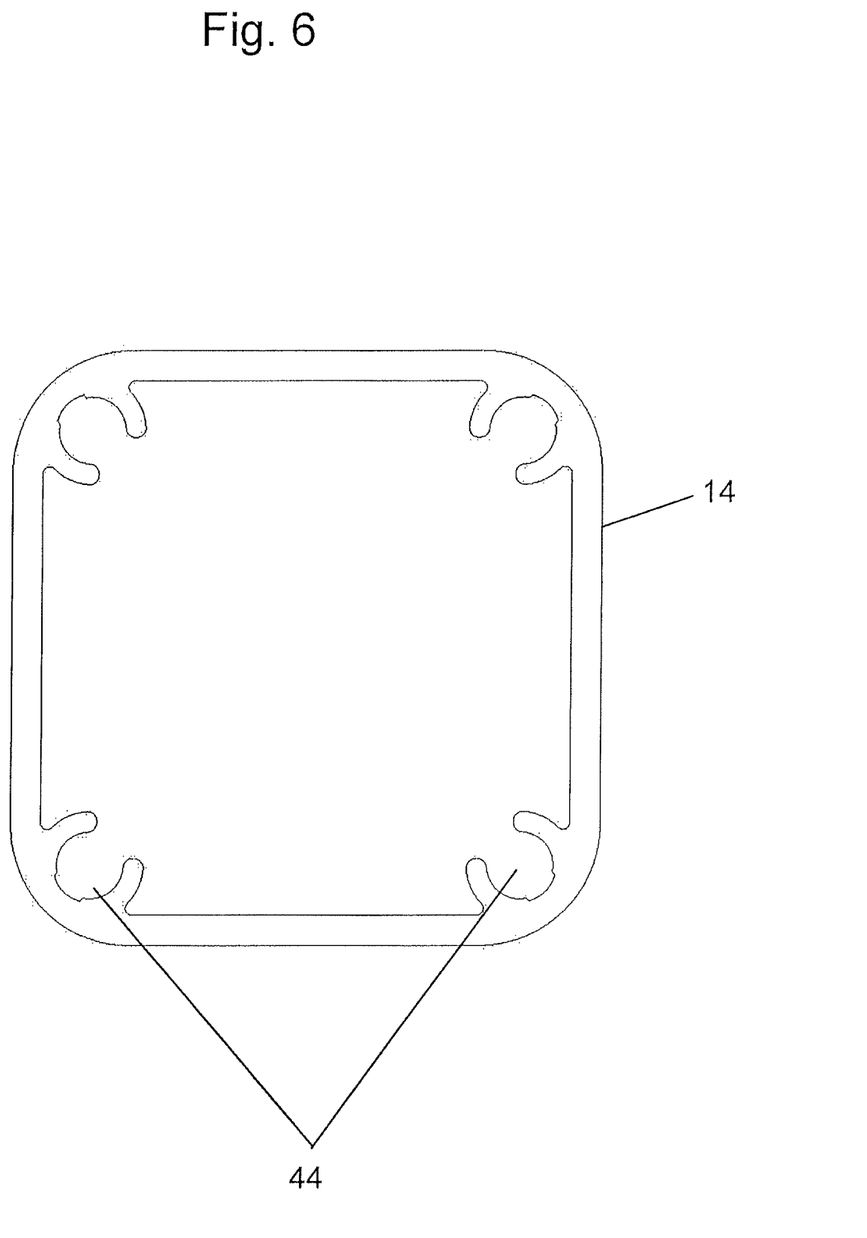
FIG. 6 is a top view of the inner tube of the lift column of FIG. 1.

Still referring to FIG. 2, the outer bearing block assembly 20 is coupled to the outer support member 12 with bolts 34 configured to engage channels 36 (shown in FIG. 5) running parallel to the axis A-A of the lift column 10. A pair of inner bearing blocks 38, 40 are coupled to the lower end of the inner tube 14 with bolts configured to engage channels 44 (shown in FIG. 6) running parallel to the axis A-A of the lift column 10. The relationship between the outer bearing assembly 20 and the inner bearing blocks 38, 40 will be described in more detail with reference to FIG. 3.

Figure 3:
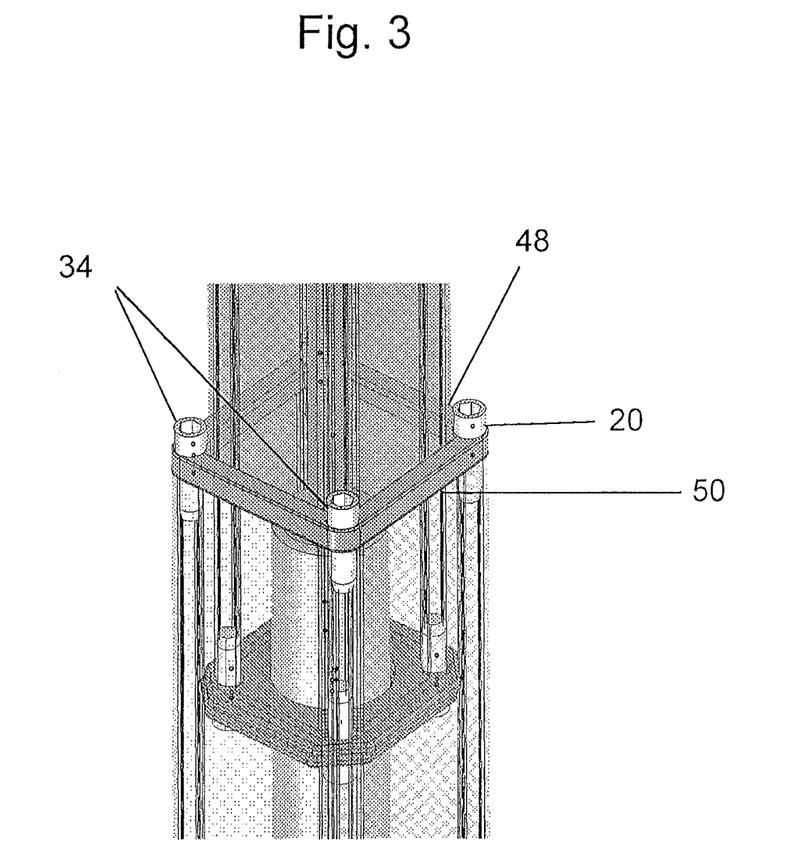
FIG. 3 is a more detailed view of the lift column of FIG. 1 showing the relationship between the outer support tube, the inner tube, the inner bearing blockings and the outer bearing block assembly.
Figure 4:
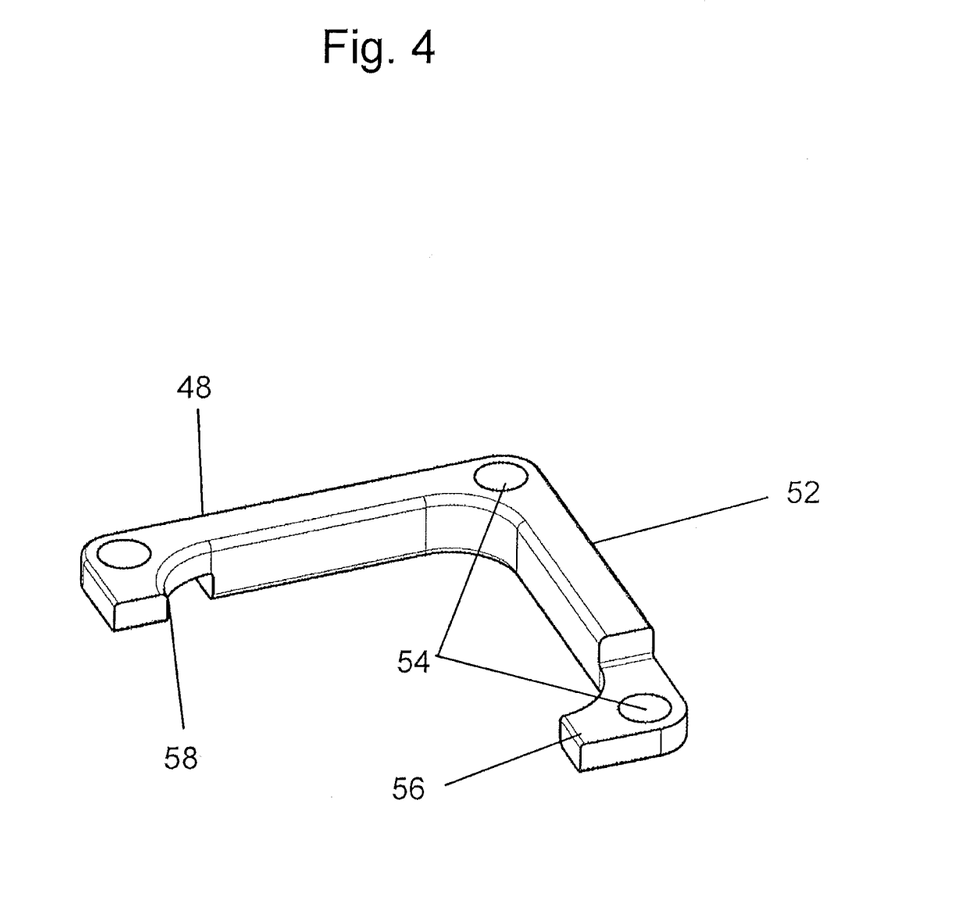
FIG. 4 is a perspective view of one portion of the outer bearing block assembly of the lift column of FIG. 1.

With reference to FIGS. 3 and 4, the outer bearing block assembly 20 is shown having a first portion 48 and a second portion 50 configured to mate to form a square-shaped bushing. With reference to FIG. 4, the first portion 48 forms half of the outer bearing block assembly 20 and includes a base portion 52 having three spaced apart bolt holes 54. The ends 56, 58 of the first portion 48 are approximately half the thickness of the assembled outer bearing block are designed to mate with the second portion 50 to form an outer bearing block assembly 20 having a substantially uniform thickness. The second portion 50 is identical to the first portion 48 and is engaged with the first portion 48 by inverting the second portion 50, aligning the bolt holes associated with the ends of the first and second portions, and inserting bolts 34 to couple the first and second portions together. The bolts 34 are also used to couple the complete bearing block assembly 20 to the outer support member 12 via channels 36.

Still referring to FIGS. 3 and 4, the holes 54 associated with the ends 56, 58 of the first portion 48 and the second portion 50 have a larger internal diameter than the outer diameter of bolts 34. In particular, the overlapping ends 56, 58 of the first portion 48 and the second portion 50 have a larger internal diameter than the bolts 34 such that the first portion 48 and the second portion 50 may be adjusted and spaced apart at a desired distance before coupling the portions together to form the complete outer bearing block assembly. Adjusting the position of the coupling between the first and second portions 48, 50 correspondingly alters the internal circumference of the outer bearing block assembly that directly contacts the inner tube 14 translating therethrough. Thus, by altering the position of the portions of the outer bearing block assembly 20 the coefficient of friction between the outer bearing block assembly 20 and the inner tube 14 can be tuned to provide a desirable resistance. It will be appreciated that variations in spacing, thickness of the components, and the like, may be altered to provide the desired coefficient of friction.

Figure 7:
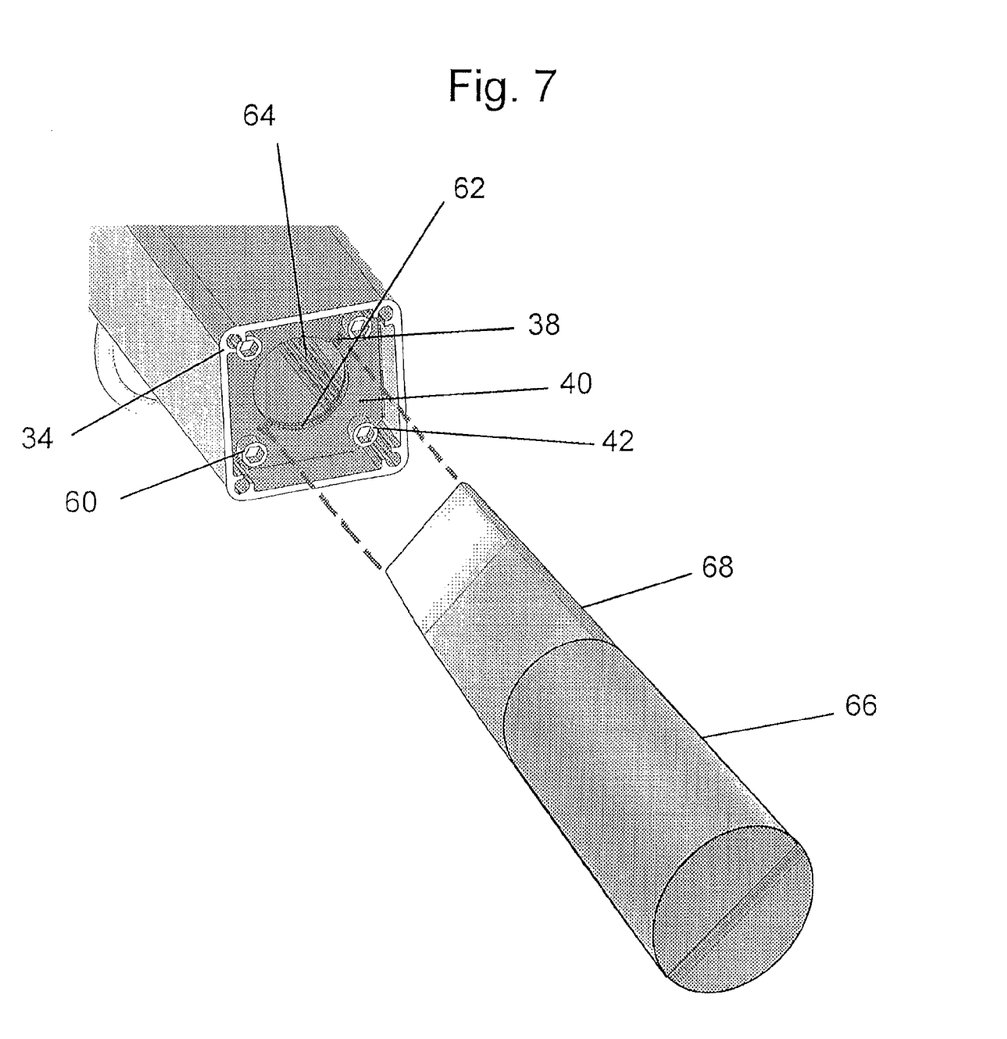
FIG. 7 is bottom perspective view of the inner tube of the lift column of FIG. 1 showing the relationship between the inner bearing blockings and the outer tube, where FIG. 7 further illustrates an adjustment tool for the inner bearing blockings.
Figure 8:
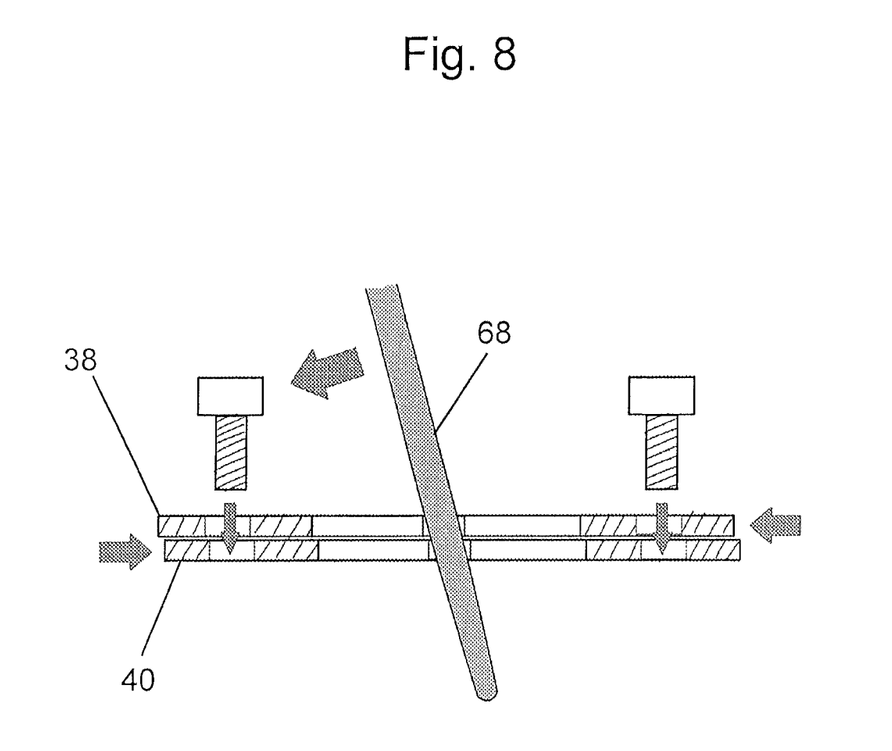
FIG. 8 is a more detailed side view of the relationship between the inner bearing blockings and the adjustment tool.

With reference to FIGS. 7 and 8, the inner tube 14 is coupled to a pair of identical inner bearing blocks 38, 40. The inner bearing blocks are substantially square-shaped plates lying adjacent and parallel to one another. Each of the inner bearing blocks 38, 40 includes a number of holes 60 through which bolts 42 are inserted into channels 44 (shown in FIG. 6). Similar to the outer bearing block assembly 20, the inner bearing blocks 38, 40 are configured to be adjusted in order to provide a desirable coefficient of friction between the inner tube 14 and the outer support member 12. The holes 60 in the inner bearing blocks 38, 40 have an internal diameter greater than the outer diameter of the bolts 42. Referring to FIG. 8, the inner bearing blocks 38, 40 include slots 62 projecting laterally from a central hole 64 configured to accept the gas spring 22.

During assembly, the inner tube 14 is inserted into the outer support member 12 as shown in FIG. 7. Once inserted, the inner bearing blocks 38, 40 are placed adjacent the bottom end of the inner tube 14 within the outer support member 12 such that the holes 60 are aligned with the channels 44 shown in FIG. 6. A tool 66 having a flattened distal end 68 corresponding to the slots 62 is then inserted into the slots 62 of the inner bearing blocks 38, 40. As shown in FIG. 8, the tool 66 is then pivoted such that the inner bearing blocks 38, 40 move relative to one another and contact the inner surface of the outer support member 12. The degree with which the tool 66 is pivoted adjusted alters the force of the inner bearing blocks 38, 40 pressing on the outer support member 12 and, thus, allows for the coefficient of friction between the inner tube 14 and the outer support member to be adjusted. When the inner bearing blocks 38, 40 are properly positioned the bolts 42 are inserted into the holes 60 to affix the inner bearing blocks 38, 40 in the proper position.

Generally, the outer bearing block assembly 20 and the inner bearing blocks 38, 40 allow the coefficient of friction and, thus, the "slop" or motion of the inner tube 14 relative to the inner tube 12 to be controlled. The adjustability of the outer bearing block assembly 20 and inner bearing blocks 38, 40 allows for the use of molded parts, rather than machined parts with tight tolerances, to be used. Furthermore, the adjustability of the components allows for the system to be retuned after periods of extended use rather than requiring the lift column 10 to be outfitted with new bearings. Providing universal components decreases the cost of the bearings and reduces costs associated with replacing worn bearings over the life of the column.

Figure 9:
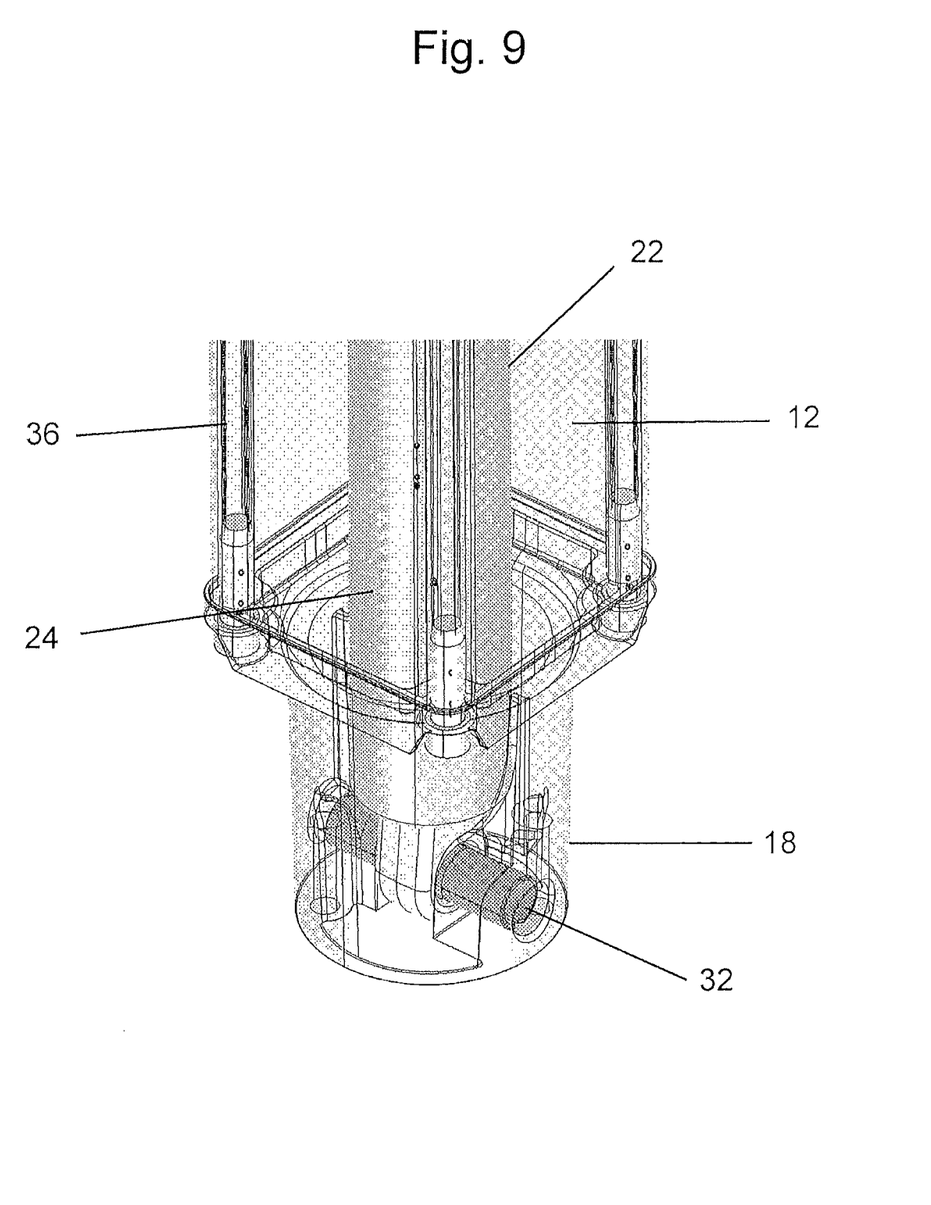
FIG. 9 is a perspective view of the base mounting of the lift column of FIG. 1.

FIG. 9 illustrates the mounting attachment 18 of the outer support member 12, where the jacket tube 24 of the gas spring is coupled to the mounting attachment 18 with a pin 32. The mounting attachment 18 is configured for attachment to any suitable base (not shown).

Figure 10:
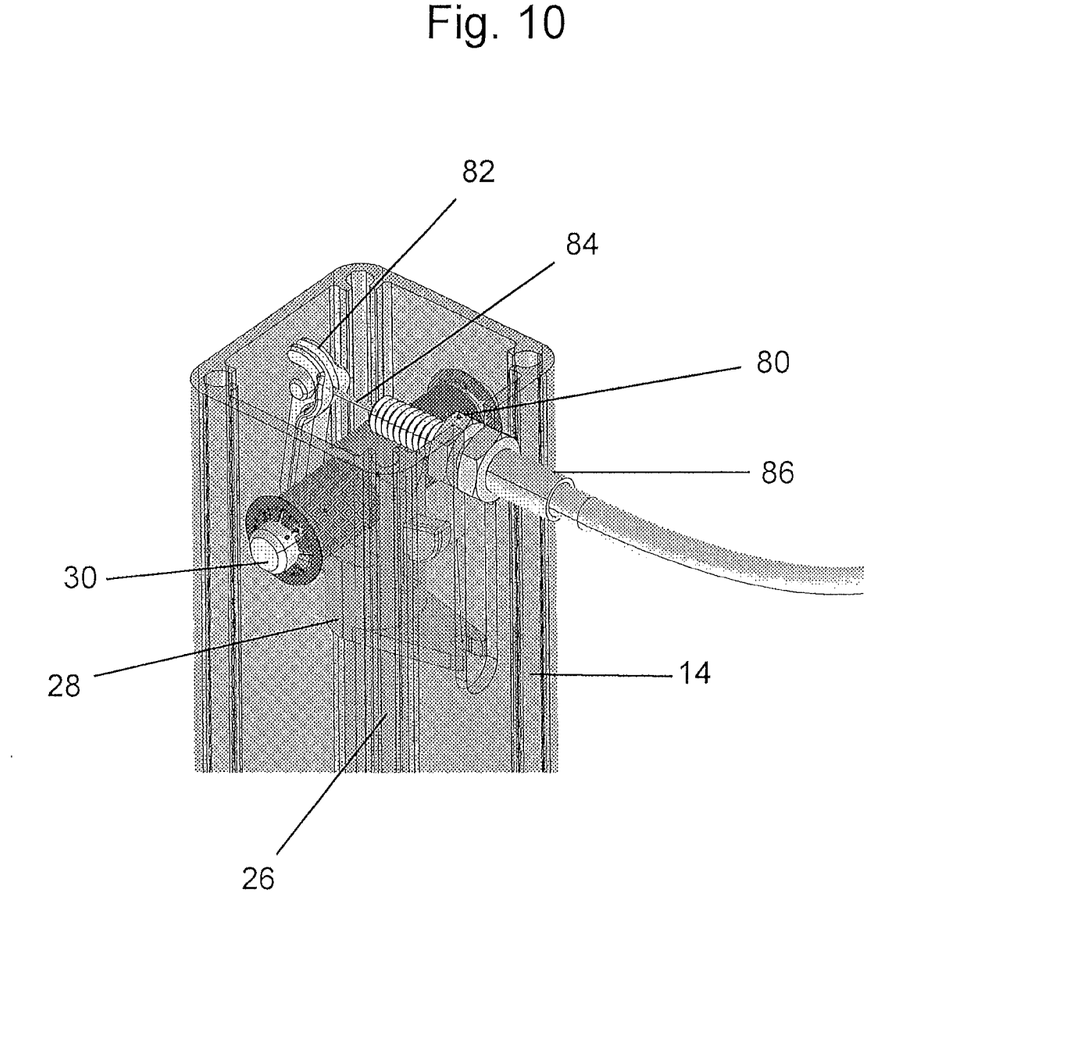
FIG. 10 is a perspective view of the adjustment mechanism associated with the gas spring of the lift column of FIG. 1.

FIG. 10 illustrates attachment of the mounting member 28 of the piston rod 26 to the inner tube 14 with a pin 30. Associated with the mounting member 28 is an adjustment assembly 80 for the gas spring 22, which is configured to raise and lower the gas spring 22. The adjustment assembly 80 includes an arm 82 associated with a valve (not shown) of the gas spring 22. A co-axial cable 84 is attached to the arm 82 at one end and is associated with an actuator (not shown) at a second end, where operation of the actuator adjusts the position of the arm 82 via the co-axial cable 84 to raise and lower the gas spring 22. As illustrated, a sheath 86 of the co-axial cable 84 is affixed directly to the inner tube 14, thereby securing the co-axial cable to the lift column 10.

Figure 11:
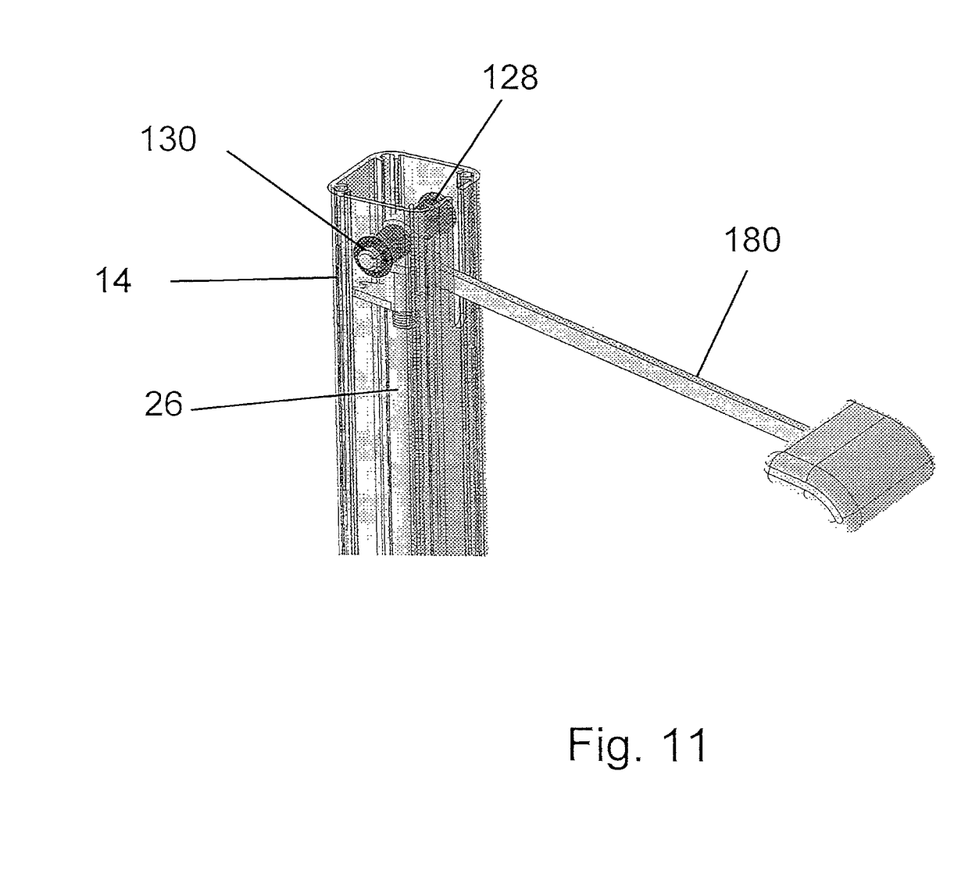
FIG. 11 is a perspective view of an alternate version of an adjustment mechanism that may be associated with the gas spring of the lift column of FIG. 1.
Figure 12:
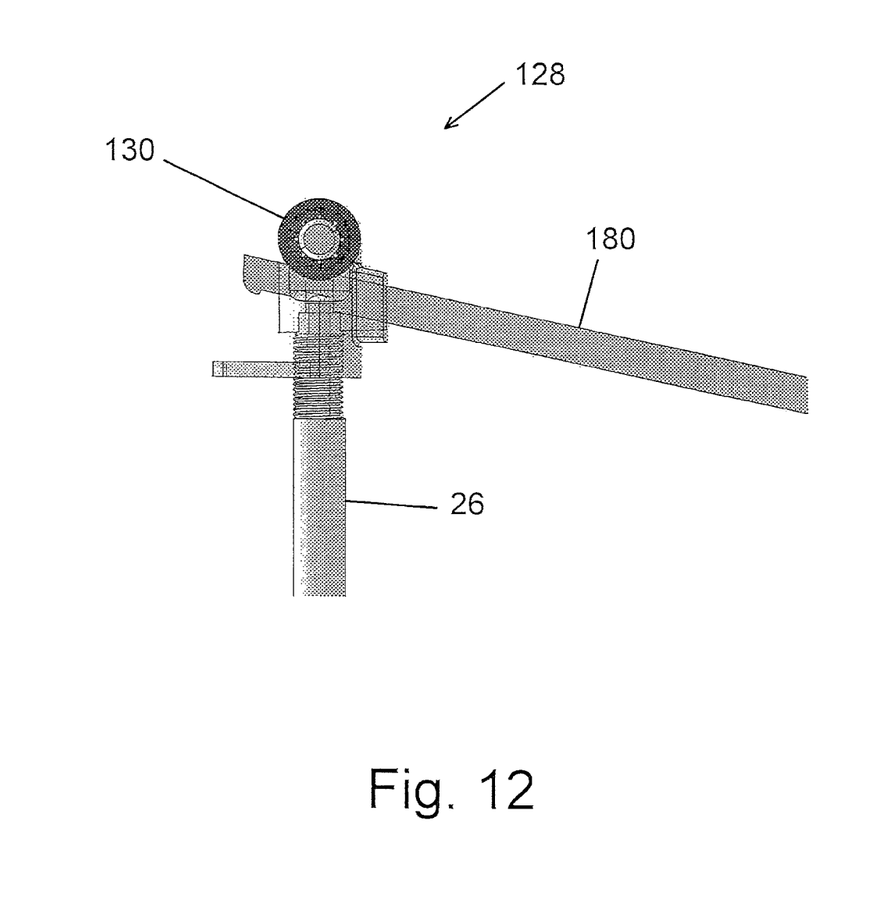
FIG. 12 is a side view of the alternate adjustment mechanism of FIG. 11.

FIGS. 11 and 12 illustrate an alternate version of a mounting member 128 of the piston rod 26 to the inner tube 14 with a pin 130. Associated with the mounting member 128 is a levered adjustment assembly 180 for the gas spring 22, which is configured to raise and lower the gas spring 22. The levered adjustment assembly 180 includes a lever 182 associated with a valve (not shown) of the gas spring 22. Operation of the lever 182 adjusts the position of the column assembly by raising and lowering the gas spring 22. It will be appreciated that any suitable actuation means for the column assembly is contemplated.

Figure 13:
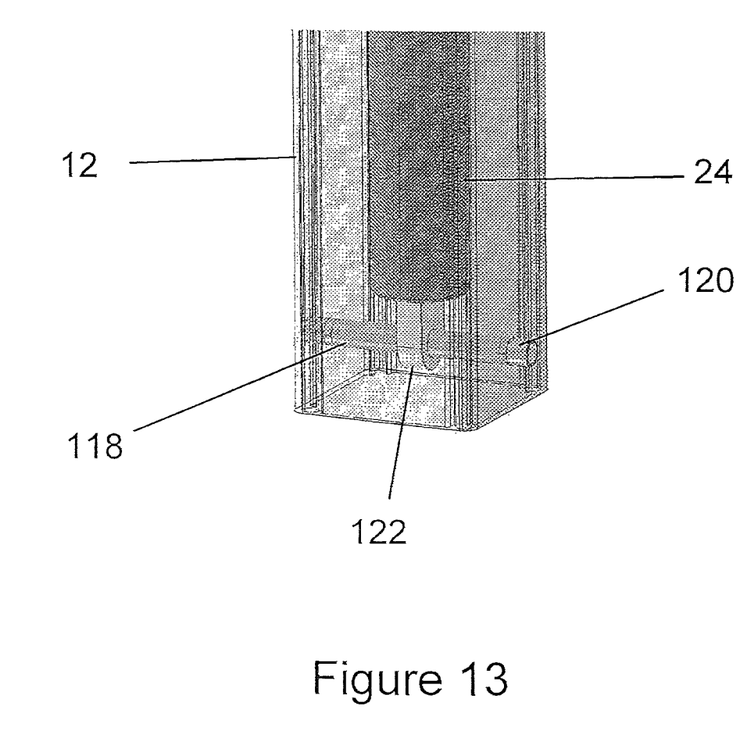
FIG. 13 is a perspective view of an alternate version of a base mounting for the lift column of FIG. 1 showing the attachment of the gas spring to the outer support member.
Figure 14:
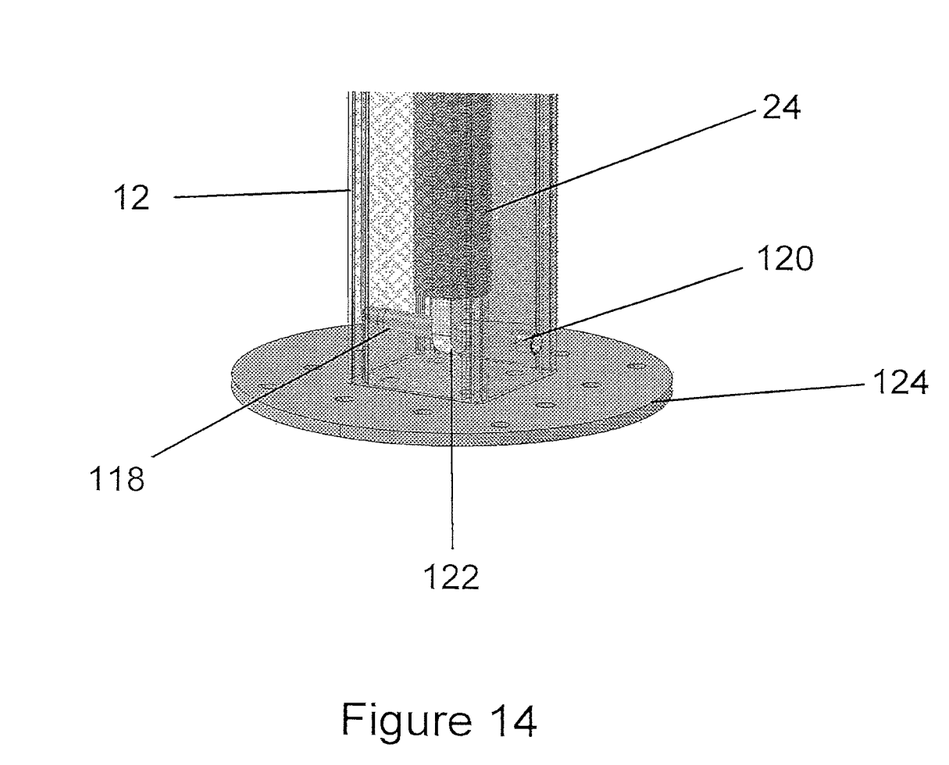
FIG. 14 is a perspective view of an alternate version of a base mounting for the lift column of FIG. 1 showing the outer support member integral with a base flange.

FIG. 13 illustrates an alternate mounting attachment 118 of the outer support member 12 and jacket tube 24, where the jacket tube 24 has a flange 122 having a through hole through which the gas spring 22 is coupled to the outer support member 12 via a pin 120. of the gas spring is coupled to the mounting attachment 18 with a pin 32. FIG. 14 illustrates an alternate version of the mounting attachment 118 shown integral with a base flange 124.

Having shown and described various embodiments of the present invention, further adaptations of the methods and systems described herein may be accomplished by appropriate modifications by those of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. An apparatus comprising:
   (a) an outer tube comprising a rectangular cross section;
   (b) an inner tube comprising a rectangular cross section, wherein the shape of the cross section of the inner tube is configured to complement the cross section of the outer tube, wherein the inner tube is positioned within the outer tube such that the outer tube and the inner tube are telescopically movable in relation to one another;
   (c) a gas spring comprising a jack tube and a piston rod, wherein the piston rod is configured to be concentrically positioned in relation to the jack tube, wherein the gas spring is positioned within the outer tube, wherein the gas spring is further positioned within the inner tube, wherein the piston rod is in communication with the inner tube, wherein the jack tube is in communication with the outer tube;
   (d) a pair of inner bearing blocks, wherein the inner tube is communicatively coupled to the pair of inner bearing blocks, wherein the pair of inner bearing blocks comprise a substantially square-shaped cross section, wherein the pair of inner bearing blocks are positioned adjacent to one another, wherein the pair of inner bearing blocks are positioned parallel to one another, wherein the pair of inner bearing blocks may be adjustably positioned in relation to each other thereby changing the coefficient of friction between the outer tube and the inner tube; and
   (e) an outer bearing block assembly comprising a first portion and a second portion, wherein the outer bearing block is in communication with the inner tube, wherein the first wherein the outer bearing block comprises at least one bolt hole extending through the first portion and the second portion, wherein the at least one bolt hole is configured to be larger than a bolt extending through the at least one bolt hole such that the positional relationship between the first portion and the second portion can be adjusted, thereby changing the coefficient of friction between the outer bearing block assembly and the inner tube.

2. The apparatus of claim 1, wherein the outer bearing block assembly comprises a substantially rectangular cross section.

3. The apparatus of claim 1, further comprising a supporting flange in communication with the outer tube.

4. The apparatus of claim 1, wherein the pair of inner bearing blocks are configured to be adjusted using a tool.

5. The apparatus of claim 4, wherein the tool comprises a flat end.

6. The apparatus of claim 1, further comprising a pin, wherein the pin is configured to couple the piston rod to the inner tube.

7. The apparatus of claim 1, wherein the inner bearing blocks are configured to be movable relative to one another by moving in parallel motion.

8. An apparatus comprising:
   (a) an outer tube comprising a rectangular cross section;
   (b) an inner tube, wherein the shape of the cross section of the inner tube is configured to complement the cross section of the outer tube, wherein the inner tube is positioned within the outer tube such that the outer tube and the inner tube are telescopically movable in relation to one another;
   (c) a gas spring comprising a jack tube and a piston rod, wherein the piston rod is configured to be concentrically positioned in relation to the jack tube, wherein the gas spring is positioned within the outer tube, wherein the gas spring is further positioned within the inner tube, wherein the piston rod is in communication with the inner tube, wherein the jack tube is in communication with the outer tube; and
   (d) a pair of inner bearing blocks, wherein the inner tube is communicatively coupled to the pair of inner bearing blocks, wherein the pair of inner bearing blocks comprise a substantially square-shaped cross section, wherein the pair of inner bearing blocks are positioned adjacent to one another, wherein the pair of inner bearing blocks are positioned parallel to one another, wherein the pair of inner bearing blocks may be adjustably positioned in relation to each other thereby changing the coefficient of friction between the outer tube and the inner tube, wherein the pair of bearing blocks are configured to be moveable in parallel motion in relation to one another.

9. The apparatus of claim 8, further comprising a supporting flange in communication with the outer tube.

10. The apparatus of claim 8, wherein the pair of inner bearing blocks are configured to be adjusted using a tool.

11. The apparatus of claim 10, wherein the tool comprises a flat end.

12. The apparatus of claim 8, further comprising a pin, wherein the pin is configured to couple the piston rod to the inner tube.

13. An apparatus comprising:
   (a) a first tube having a rectangular cross section;
   (b) a second tube having a rectangular cross section, wherein the first tube is configured to telescopically move in relation to the second tube; and
   (c) at least one set of bearing blocks in communication with the first tube and the second tube, wherein the at least one set of bearing blocks are configured to lie transverse in relation to the first tube and the second tube, wherein the at least one set of bearing blocks are configured to be placed in parallel in relation to one another, wherein the at least one set of bearing blocks are configured to be movable so as to change the coefficient of friction between the first tube and the second tube, wherein the at least one set of bearing blocks comprises at least one bolt hole configured to receive at least one bolt, wherein the at least one bolt may be used to secure the position of the at least one set of bearing blocks in relation to each other.

14. The apparatus of claim 13, wherein the at least one set of bearing blocks comprises a rectangular cross section.

15. The apparatus of claim 13, further comprising a gas spring positioned within the first tube and the second tube, wherein the gas spring is coupled to the first tube, wherein the gas spring is further coupled to the second tube.

16. The apparatus of claim 13, wherein the at least one set of bearing blocks comprises at least two bearing blocks.

17. The apparatus of claim 13, wherein the at least one set of bearing blocks are configured to be adjusted using a tool.

18. The apparatus of claim 17, wherein the tool comprises a flat engagement portion.

19. The apparatus of claim 13, further comprising a supporting flange in communication with the first tube.

* * * * *